(12) United States Patent
Liu

(10) Patent No.: US 11,203,375 B2
(45) Date of Patent: Dec. 21, 2021

(54) ADJUSTMENT BUSHING, STEERING COLUMN AND VEHICLE

(71) Applicants: MANDO CORPORATION, Gyeonggi-do (KR); Mando China Holdings Ltd., Gyeonggi-do (KR)

(72) Inventor: Zhuo Liu, Gyeonggi-do (KR)

(73) Assignees: MANDO CORPORATION, Gyeonggi-do (KR); MANDO CHINA HOLDINGS LTD., Gyeonggi-do (KR)

( * ) Notice: Subject to any disclaimer, the term of this patent is extended or adjusted under 35 U.S.C. 154(b) by 23 days.

(21) Appl. No.: 16/735,527

(22) Filed: Jan. 6, 2020

(65) Prior Publication Data
US 2021/0024118 A1  Jan. 28, 2021

(30) Foreign Application Priority Data
Jul. 26, 2019 (CN) .......................... 201910681079.1

(51) Int. Cl.
*B62D 1/19* (2006.01)
*F16F 15/08* (2006.01)
*B62D 7/22* (2006.01)

(52) U.S. Cl.
CPC .............. *B62D 1/19* (2013.01); *F16F 15/085* (2013.01); *B62D 7/22* (2013.01)

(58) Field of Classification Search
CPC . B62D 1/18; B62D 1/19; B62D 1/185; B62D 1/192
See application file for complete search history.

(56) References Cited

U.S. PATENT DOCUMENTS

| | | | | |
|---|---|---|---|---|
| 8,051,742 B2* | 11/2011 | Osawa | ................... | B62D 1/184 74/493 |
| 9,114,828 B2* | 8/2015 | Fujiwara | ................ | B62D 1/185 |
| 9,283,981 B2* | 3/2016 | Yokota | ................... | B62D 1/187 |
| 2014/0026707 A1* | 1/2014 | Yokota | ................... | B62D 1/187 74/493 |
| 2015/0232116 A1* | 8/2015 | Yokota | ................... | B62D 1/185 74/493 |
| 2016/0176436 A1* | 6/2016 | Ku | ........................ | B62D 1/195 74/493 |
| 2018/0201295 A1* | 7/2018 | Schnitzer | ................ | B62D 1/19 |
| 2019/0185045 A1* | 6/2019 | Takahashi | .............. | B62D 1/192 |

* cited by examiner

*Primary Examiner* — James A English
(74) *Attorney, Agent, or Firm* — Ladas & Parry, LLP

(57) ABSTRACT

The present application relates to an adjustment bushing, a steering column and a vehicle. The adjustment bushing comprises: a frame provided with a linear track that allows an adjusting bolt to slide left and right; and damping structures respectively disposed near both ends of the linear track and including convex hulls extending from upper and lower inner sides of the frame into the linear track, wherein, when the adjusting bolt slides to both ends of the linear track to extreme positions of the linear track, the convex hulls are squeezed between the adjusting bolt and the frame to play a damping role. The adjustment bushing can rebound after the endurance adjustment, has excellent noise reduction and energy absorption effect, and improves the durability and service life of the adjustment bushing.

13 Claims, 4 Drawing Sheets

ADJUSTMENT BUSHING, STEERING COLUMN AND VEHICLE

CROSS-REFERENCE TO RELATED APPLICATION

This application claims priority to Chinese Patent Application No. 201910681079.1, filed Jul. 26, 2019, entitled "Adjustment Bushing, Steering Column and Vehicle", the content of Which is hereby incorporated by reference in its entirety.

TECHNICAL FIELD

The present application relates to the field of vehicle steering technology, and particularly, to a back and forth adjustment hushing for noise reduction and energy absorption, a steering column and a vehicle.

BACKGROUND

The vehicle steering column is a device that can change the driving direction of the vehicle according to the driver's intentions. The two-way steering column has been unable to meet the higher demands of people, and the four-way steering column that can realize the position adjustment in the up/down, and forth/back directions is gradually occupying a dominant position.

The four-way steering column, that is, the steering wheel is adjustable in four directions. The steering wheel can be adjusted up and down or back and forth by loosening a locking mechanism on the steering column, so as to suit people having different body types and driving habits, thereby operating the vehicle more comfortably.

The up and down adjustment of the steering wheel means that the steering wheel is angularly adjusted around a rotating shaft. The locking mechanism of the steering column is loosened, and the position of the steering wheel is adjusted up and down around the rotating shaft, and then locked when it is adjusted to a proper position, so as to achieve the up and down adjustment of the steering wheel.

The hack and forth adjustment of the steering wheel means that the steering wheel is adjusted back and forth along an axis direction of the column. The locking mechanism of the steering column is loosened, an upper tube and a lower tube slide relatively, and a adjusting bolt slides relatively in a sliding track, so that the steering wheel can be adjusted back and forth along the axis direction of the column, and then locked when the steering wheel is in the proper position.

The back and forth adjusting mechanism of the steering column is an adjustment bushing formed by an elliptical frame having a certain thickness. When the steering column is adjusted back and forth, the adjusting bolt slides and directly collides with the upper pipe to make a metal impact sound.

In order to solve the problem as described above, as shown in FIG. 1, in the prior art, a rubber block 101 made of NBR70 (Nitrile Butadiene Rubber, NBR) is used as a noise reduction mechanism, and is assembled into the adjustment bushing 100 to achieve noise reduction and energy absorption. However, the rubber block 101 of the adjustment bushing 100 according to the prior art has a large amount of force deformation, and after the endurance adjustment, it will be permanently plastically deformed and unable to rebound, thereby resulting in a shorter service life of the noise reduction function, and the effect of noise reduction and energy absorption of the adjustment bushing 100 is not adjustable.

SUMMARY

Technical Problems to be Solved

An objective of the present application is to provide a back and forth adjustment bushing for noise reduction and energy absorption, so as to solve the problem that the noise reduction and energy absorption effect of the existing adjustment bushing is not adjustable, and the adjustment bushing cannot rebound after the endurance adjustment.

Another objective of the present application is to provide a steering column and a vehicle including the above-mentioned back and forth adjustment bushing for noise reduction and energy absorption, so as to solve the problem that the noise reduction and energy absorption effect of the existing adjustment bushing is not adjustable, and the adjustment bushing cannot rebound after the endurance adjustment.

Technical Solutions

In order to solve the above technical problem, in one aspect, present application provides an adjustment bushing comprising: a frame provided with a linear track that allows an adjusting bolt to slide left and right; and damping structures respectively disposed near both ends of the linear track and including convex hulls extending from the upper and lower inner sides of the frame into the linear track, wherein, when the adjusting bolt slides to both ends of the linear track to extreme positions of the linear track, the convex hulls are squeezed between the adjusting bolt and the frame to play a damping role.

Alternatively, the convex hulls extend perpendicularly from the upper and lower inner sides of the frame into the linear track.

Alternatively, the convex hulls extend obliquely from the upper and lower inner sides of the frame toward both ends of the linear track.

Alternatively, the damping structures respectively disposed near both ends of the linear track are symmetrical to each other, and the convex hulls included in each of the damping structures are symmetrical to each other up and down.

Alternatively, the convex hulls are provided with hollows.

Alternatively, the frame is integrally formed with the damping structures.

Alternatively, the frame and the damping structures are formed by an injection molding process.

Alternatively, the frame and the damping structures are made of POM, PA66 or PET.

In another aspect, the present application provides a steering column including the above-mentioned adjustment bushing.

In still another aspect, the present application provides a vehicle including the above-mentioned adjustment bushing.

Beneficial Effects

Compared with the prior art, the present application has the following advantages: the present application provides an adjustment bushing comprising: a frame provided with a linear track that allows an adjusting bolt to slide left and right; and damping structures respectively disposed near both ends of the linear track and including convex hulls extending from the upper and lower inner sides of the frame into the linear track, wherein, when the adjusting bolt slides to both ends of the linear track to the extreme positions of the linear track, the convex hulls are squeezed between the adjusting bolt and the frame to play a damping role. Thus, the adjustment bushing according to the embodiments of the present application has a damping effect on the adjusting bolt sliding to both ends of the linear track by the convex hulls extending from the upper and lower inner sides of the frame. When the convex hulls are squeezed between the adjusting bolt and the frame, the convex hulls extending up and down are in contact with the upper and lower sides of the adjusting bolt, and the damping structures according to the embodiment of the present application have small deformations in comparison with the damping rubber contacting the upper, lower and side edges of the adjusting bolt in the prior art. Therefore, the convex hulls can rebound after the endurance adjustment, has excellent noise reduction and energy absorption effect, and improves the durability and service life of the adjustment bushing.

BRIEF DESCRIPTION OF THE DRAWINGS

The above and other objects, features and other advantages of the present application will be understood more clearly from the following detailed description with reference to the accompanying drawings, in which.

Figure 1:
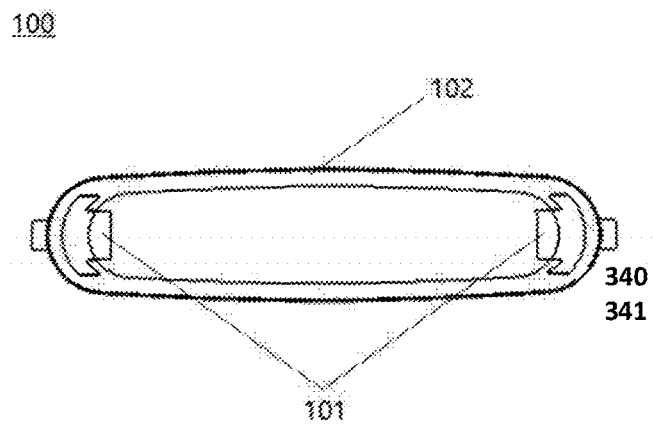
FIG. 1 is a schematic view illustrating the structure of an adjustment bushing according to the prior art.
Figure 2:
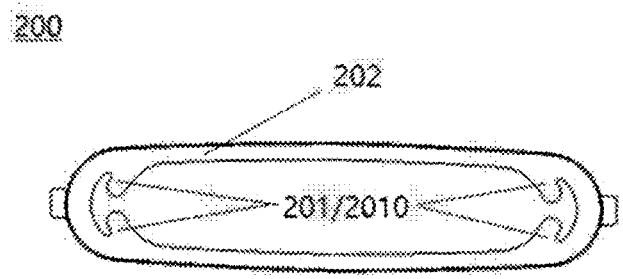
FIG. 2 is a schematic view illustrating the structure of an adjustment bushing according to an embodiment of the present application.
Figure 3:
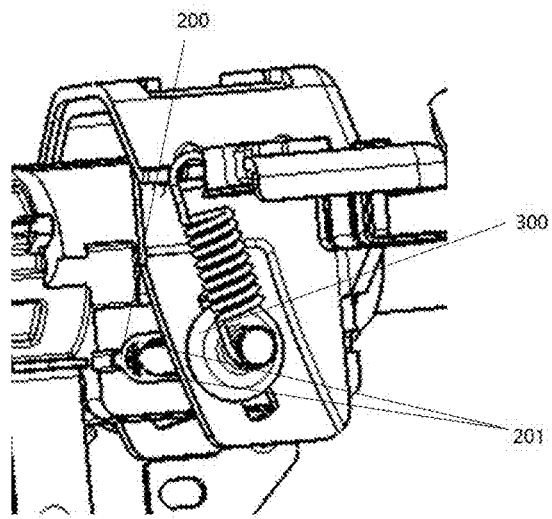
FIG. 3 is a schematic view illustrating the assembly of an adjustment bushing according to an embodiment of the present application.
Figure 4:
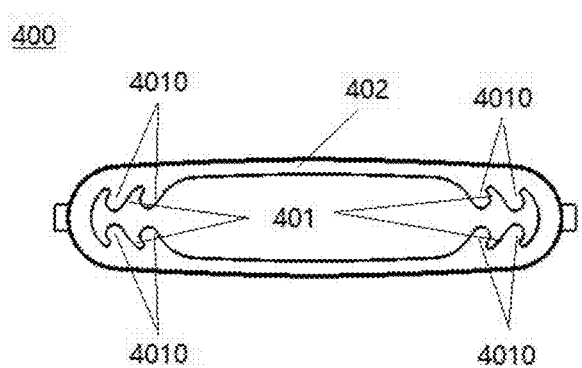
FIG. 4 is a schematic view illustrating the structure of an adjustment bushing according to another embodiment of the present application.

LIST OF REFERENCE SIGNS 100, 200, 400, 500: adjustment bushing
101: rubber block
201, 401, 501: damping structure
2010, 4010, 5010: convex hull
102, 202, 402, 502: frame
300: adjusting bolt
503: hollow

DETAILED DESCRIPTION

The specific implementations of the present application are further described in detail below with reference to the drawings and embodiments. The following embodiments are intended to illustrate the application, but not to limit the scope of the application.

In the description of the present application, it is to be noted that the orientation or positional relationship indicated by the terms "center", "longitudinal", "lateral", "upper", "lower", "front", "rear", "left", "right", "upright", "horizontal", "top", "bottom", "inside", "outside", etc., is based on the orientation or positional relationship shown in the drawings, only for the convenience of describing the present application and simplifying the description, and not intended to indicate or imply that the device or component referred to must have a particular orientation, be constructed and operated in the particular orientation, and thus cannot be construed as a limitation to the present application. Moreover, the terms "first", "second", "third", and the like are used for descriptive purposes only and cannot be construed to indicate or imply relative importance.

In the description of the present application, it is to be noted that the terms "installation", "joined" and "connected" should be understood in a broad sense unless explicitly stated and defined otherwise, for example, it may be either fixedly connected or detachably connected, or may be integrally connected; it may be mechanically connected, or electrically connected; it may be directly connected, or indirectly connected through an intermediate medium, or may be internal communication of two elements. For those of ordinary skill in the art, the specific meanings of the terms above in the present application can be understood in accordance with specific conditions.

Further, in the description of the present application, "a plurality of", "multiple", and "multiple sets" mean two or more unless otherwise specified The present application provides an adjustment bushing comprising: a frame provided with a linear track that allows an adjusting bolt to slide left and right; and damping structures respectively disposed near both ends of the linear track and including convex hulls extending from the upper and lower inner sides of the frame into the linear track, wherein, when the adjusting bolt slides to both ends of the linear track to the extreme positions of the linear track, the convex hulls are squeezed between the adjusting bolt and the frame to play a damping role.

The adjustment bushing 200 includes a frame 202 and a damping structure 201. An adjusting bolt 300 for adjusting the steering column back and forth will form a linear sliding track when adjusting back and forth. The adjustment bushing 200 includes a frame 202 provided with a linear track that allows the adjusting bolt 300 to slide left and right (back and forth). The frame 202 may be formed in a ring structure having an elliptical shape. For example, the inner hollow structure of the frame 202 may be a linear track having an elliptical contour such that the arcs at both ends of the frame 202 correspond to the circular arc segments of the adjusting bolt. According to an embodiment of the present application, the outer contour of the frame 202 has an elliptical contour corresponding to the inner elliptical contour. It should be understood that the shape of the frame 202 of the present application is not limited thereto, as long as a track for adjusting the bolt to slide left and right can be provided.

The damping structures 201 are respectively disposed near both ends of the linear track of the frame 202, and when the adjusting bolt moves left and right to the extreme positions of both ends of the linear track, the damping structures 201 dampen the adjusting bolt, that is, the damping structures 201 reduce the noise and absorb the collision energy, so as to reduce the damage to components such as the column and the bushing, and thus the service life of the related components can be increased, the noise can be reduced and the driver's driving experience can be improved.

The damping structure 201 includes convex hulls 2010 extending from the upper and lower inner sides of the frame into the linear track in the vicinity of the linear track. A connecting line of the upper and lower inner sides of the frame 202 is perpendicular to the sliding track of the adjusting bolt. The convex hulls 2010 extend from the upper and lower inner sides of the frame 202 into the interior of the track to form an obstacle on the sliding track of the adjusting bolt. When the adjusting bolt 300 collides with the convex hulls 2010 during the sliding process, a pressing force is generated on the convex hulls 2010, and the convex hulls 2010 are squeezed between the adjusting bolt 300 and the frame 202, thereby buffering the adjusting bolt 300. The collision sound caused by the direct collision between the adjusting bolt 300 and the frame 202 is reduced, the noise is reduced, and the convex hulls 2010 can absorb part of the sliding kinetic energy by their own deformations, reducing the damage of the collision to the adjusting bolt 300 and the adjustment bushing 200, and also reducing the damage to other components such as the column and extending the service life of the corresponding components. Compared with the deformation of the rubber enclosing the side end of the adjusting bolt in the prior art, the convex hulls according to the embodiments of the present application are in contact with the upper and lower sides of the adjusting bolt with less deformation, and a good resilience can be maintained after the endurance adjustment.

According to an embodiment of the present application, the convex hulls 2010 extend perpendicularly to the linear track from the upper and lower inner sides of the frame 300, or extend obliquely toward both ends while extending into the linear track. The present application is not limited thereto, and the direction in which the convex hulls extend can be adjusted as needed. According to an embodiment of the present application, the convex hulls 2010 extend obliquely outward from the upper and lower inner sides of the frame 300, so that the adjusting bolt can be better dampened.

The damping structures 201 respectively disposed at both ends of the linear track of the frame 300 are symmetrical to each other, so that the adjusting bolt is similarly stressed at the extreme positions at both ends, and the damage to the adjusting bolt and the adjustment bushings is reduced.

The convex hulls 2010 included in the damping structures 201 and respectively extending from the upper and lower inner sides of the frame 300 are vertically symmetrical. This ensures a uniform damping force on the upper and lower sides of the adjusting bolt and increases the service life of the adjusting bolt and the adjustment bushing.

According to embodiments of the present application, different damping effects can be obtained by adjusting the number of convex hulls. According to an embodiment of the present application, each of the damping structures 201 disposed at both ends of the linear track includes one convex hull 2010 extending from the upper and lower sides, that is, the adjustment bushing 200 has a total of four convex hulls. According to another embodiment of the present application, each of the damping structures 401 disposed at both ends of the linear track includes two convex hulls 4010 extending from the upper and lower sides, that is, the adjustment bushing 400 has a total of eight convex hulls 4010. It should be understood that the present application is not limited thereto, and the number of convex hulls can be adjusted as needed.

According to an embodiment of the present application, hollows 503 may be provided on the convex hulls 5010. When in contact with the adjusting bolt, the hollows 503 can increase the deformation area, thereby improving the energy absorbing effect by increasing its deformation amount.

According to an embodiment of the present application, the damping structures and the frame may be integrally formed. The convex hulls are integrally formed with the frame. Specifically, the frame and the convex hulls can be integrally formed by an injection molding process. Specifically, the material of the plate material forming the adjustment bushing needs to satisfy the criteria of good mechanical strength and dimensional stability, good machinability, high surface hardness, and the like. Optionally, the present application uses a plastic material such as POM (Polyformaldehyde), PA66 (Polyamide), PET (polyethylene terephthalate) the like, and preferably, POM plate is used as a material for making the adjustment bushing.

Figure 5:
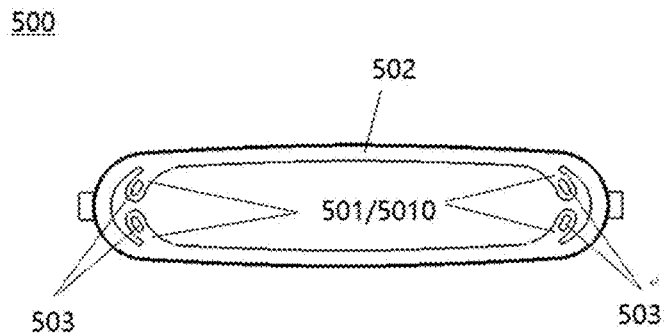
FIG. 5 is a schematic view illustrating the structure of an adjustment bushing according to still another embodiment of the present application.

Preferably, as shown in FIG. 5, the adjustment bushing 500 according to the present embodiment is an integral back and forth adjustment bushing including four convex hulls 5010 with hollows 503, and is made of a POM material.

Hereinafter, taking the existing adjustment bushing 100 as a comparative example, the adjustment bushing 500 of the present embodiment as described above and the existing adjustment bushing 100 are tested through noise test, pressure and displacement relationship test, and adjustment endurance test, so as to respectively compare and verify the noise reduction capability, the resilience after pressure, and the adjustment durability. Wherein the existing adjustment bushing 100 is as shown in FIG. 1, the rubber blocks 101 made of NBR70 material are respectively integrated at the left and right side ends of the adjustment bushing 100 as the damping structures, and the frame 102 of the adjustment bushing 100 is made of POM material.

Noise Test

The adjustment bushing 100 according to the comparative example and the adjustment bushing having an integrated damping structures according to an embodiment of the present application are respectively assembled to the steering column, and after the steering column is installed at an actual vehicle angle, the locking structure of the steering column is released. The back and forth adjustment impact speed is set to 1 m/s and the impact force at the end of the stroke is 500 N. A microphone was placed at a distance of 300 mm from the center of the adjustment bushing to measure the noise generated by the steering column during five back and forth adjustment movements and record the noise value.

The noise values generated when the steering column respectively equipped with the adjustment bushing 100 of the comparative example and the adjustment bushing 500 of the embodiment of the present application performs through back and forth adjustment movement are respectively shown in the following table, and the maximum value of the noise values measured in each group are compared. The smaller the maximum value, the better the noise reduction effect. It can be seen that the steering column equipped with the adjustment bushing 500 of the embodiment of the present application is superior to the steering column equipped with the adjustment bushing of comparative example at the overall noise reduction level.

TABLE 1

Measured results of the noise test

| | Test data (dBA) | | | | | | | | | |
|---|---|---|---|---|---|---|---|---|---|---|
| | Comparative example | | | | | Embodiment | | | | |
| Diff. | first time | second time | third time | fourth time | fifth time | first time | second time | third time | fourth time | fifth time |
| forth | 81.5 | 76.2 | 81.9 | 82.3 | 81.5 | 85.0 | 86.1 | 85.3 | 85.4 | 85.9 |
| back | 88.3 | 88.8 | 87.9 | 88.9 | 88.7 | 83.2 | 84.6 | 83.5 | 83.0 | 84.4 |

Experiment on the Relationship Between Pressure-Bearing and Displacement

The adjustment bushing 100 according to the comparative example and the adjustment bushing having an integrated damping structures according to an embodiment of the present application were respectively assembled to the steering column, and the locking structure of the steering column was released, so that the steering column was vertically loaded on a UTM press. The steering impact force of 30 kgf and 50 kgf was applied to the steering column equipped with the adjustment bushing 100 of the comparative example and the steering column equipped with the adjustment bushing 500 of the embodiment of the present application, respectively, and the deformation displacement was recorded.

Figure 6A:
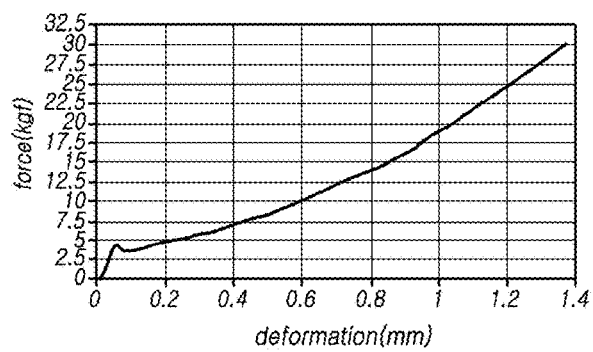
FIGS. 6a, 6b respectively illustrate the experimental results of the relationship between the pressure-bearing and the displacement of the adjustment bushings of the comparative example and an embodiment of the present application.
Figure 6A:
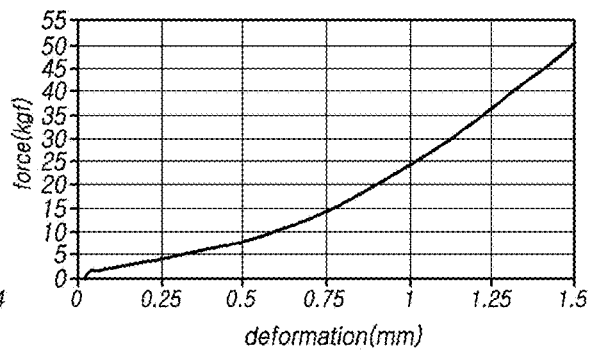
Figure 6B:
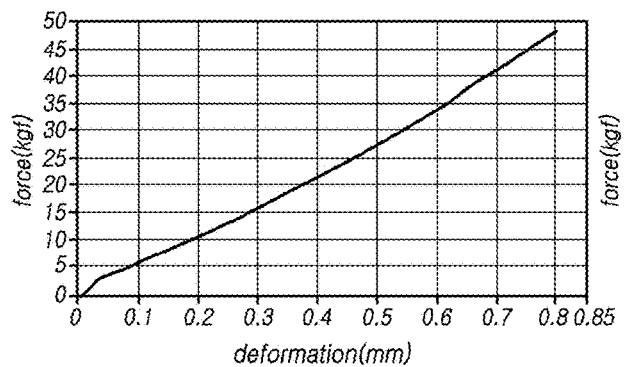
Figure 6B:
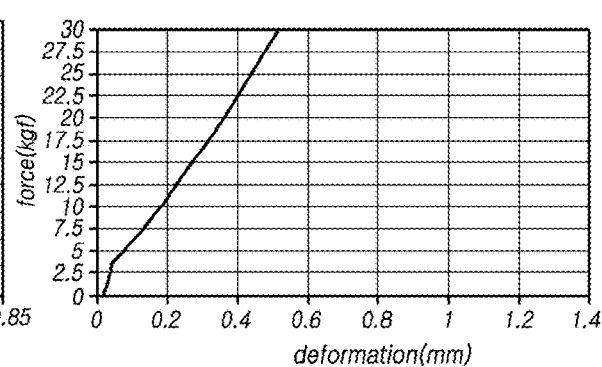

The deformation variables occurred when the steering columns equipped respectively with the adjustment bushing 100 of the comparative example and the adjusting bush 500 of the embodiment of the present application were subjected to the adjustment impact force of 30 kgf and 50 kgf, are as shown in FIGS. 6a and 6b. It can be seen that the adjustment bushing of the comparative example is deformed by about 1.5 mm when subjected to the adjustment impact force of 30 kgf or more, and the deformation amount is nonlinear in the case of increasing force, indicating that the rubber block 101 of the adjustment bushing 100 of the comparative example cannot rebound after the endurance adjustment. While the adjustment bushing 500 of the embodiment of the present application is deformed by 0.5 mm when subjected to 30 kgf, and deformed by 0.8 mm when subjected to 50 kgf, and the deformation amount is linear, so that it can rebound to the original shape after being pressurized.

Retention Test after the Endurance Adjustment

Figure 7A:
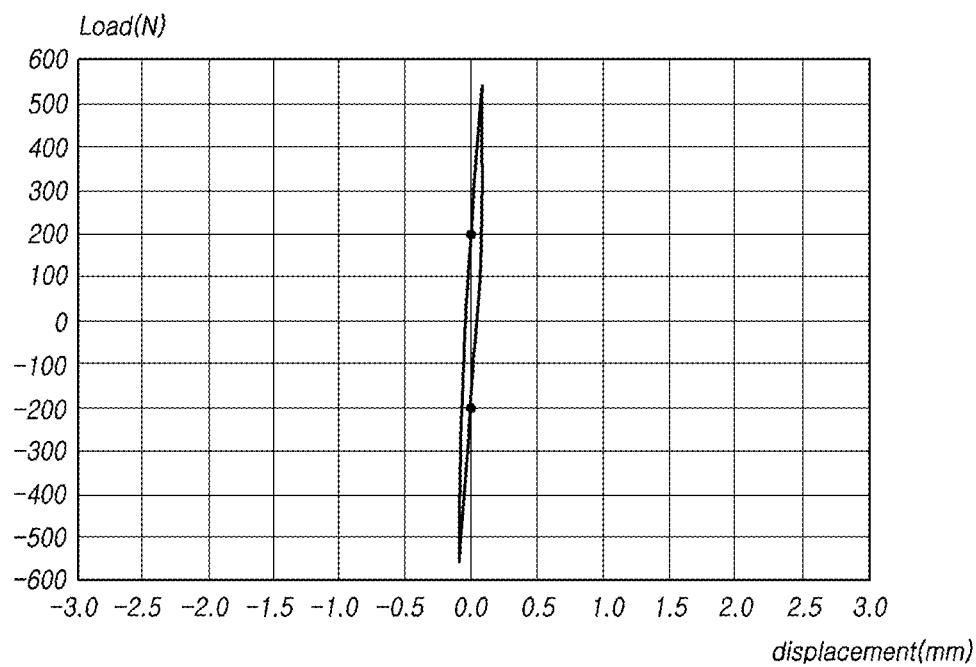
FIGS. 7a, 7b respectively illustrate the adjustment endurance test of the adjustment bushing of an embodiment of the present application.
Figure 7B:
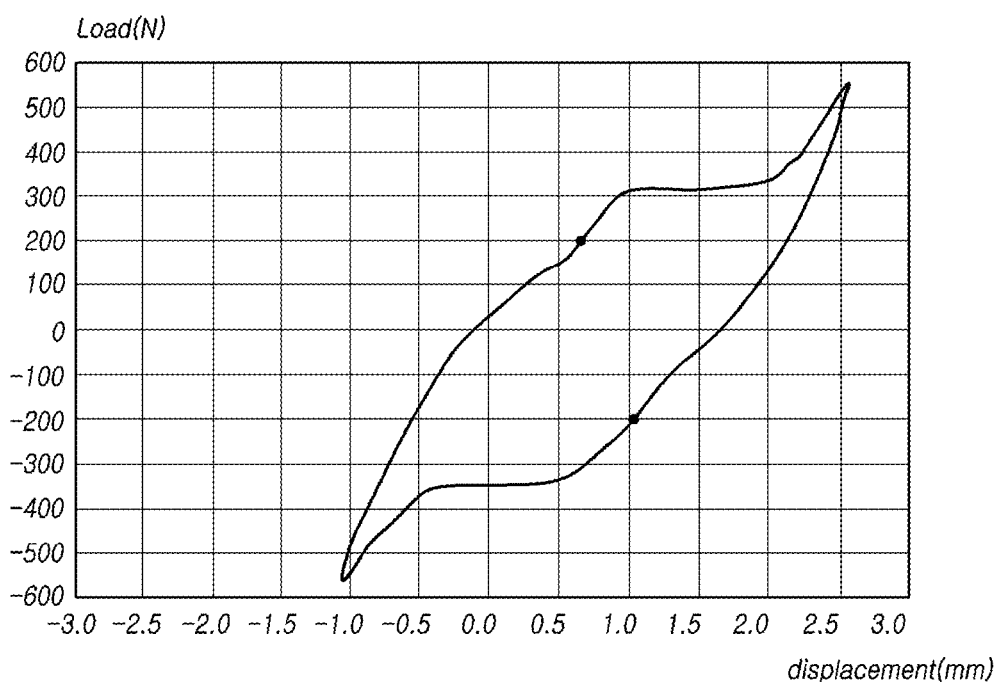

After the adjustment bushing having an integrated damper structures of an embodiment of the present application was assembled into the steering column, and the steering column was installed at an actual vehicle angle, the cycle according to the sequence of releasing the locking structure, downward, forward, upward, backward, locking, and releasing was repeated 2000 times. The results of height adjustment retention and angle adjustment retention are shown in FIGS. 7a and 7b. No cracks and breaks occurred in each component, and the locking retention force was greater than 500 N, which met the test criteria.

In addition, in this test, the steering column was placed in the −40° C. environment for 8 hours. After being removed, the steering column was directly subjected to the lock retention force test and the lock retention force test after the endurance adjustment. The test results are that, no cracks and breaks occurred in the two sets of adjustment bushings, and the locking retention force was greater than 500-N, which also met the criteria. No additional test results table is attached in this specification.

In another aspect, the present application also provides a steering column comprising the adjustment bushing as described above, so as to reduce the noise and absorb energy as well as adjust the effect of noise reduction and energy absorption, and achieve rebound after the endurance adjustment.

In still another aspect, the present application also provides a vehicle comprising the adjustment bushing as described above, so as to reduce the noise and absorb energy as well as adjust the effect of noise reduction and energy absorption, and achieve rebound after the endurance adjustment.

Compared with the prior art, the present application has the following advantages: the present application provides an adjustment bushing comprising: a frame provided with a linear track that allows an adjusting bolt to slide left and right; and damping structures respectively disposed near both ends of the linear track and including convex hulls extending from the upper and lower inner sides of the frame into the linear track, wherein, when the adjusting bolt slides to both ends of the linear track to the extreme positions of the linear track, the convex hulls are squeezed between the adjusting bolt and the frame to play a damping role. Thus, the adjustment bushing according to the embodiments of the present application dampens the adjusting bolt sliding to both ends of the linear track by the convex hulls extending from the upper and lower inner sides of the frame. When the convex hulls are squeezed between the adjusting bolt and the frame, the convex hulls extending up and down are in contact with the upper and lower sides of the adjusting bolt. The damping structures according to the embodiment of the present application have less deformation in comparison with the damping rubber contacting the upper, lower and side edges of the adjusting bolt in the prior art, so it can still rebound after the endurance adjustment, has excellent noise reduction and energy absorption effect, and improves the durability and service life of the adjustment bushing.

The descriptions above are only the preferred embodiments of the present application, and are not intended to limit the present application. Any modifications, equivalent substitutions or improvements made within the spirit and principles of the present application should be included in the protection scope of the present application.

What is claimed is:

1. An adjustment bushing, comprising:
   a frame having a hollow through which an adjusting bolt penetrates, the adjusting bolt configured to be slidable with respect to the frame between two ends of the hollow of the frame,
   wherein:
   the frame has inner side surfaces formed between the two ends of the hollow of the frame, and
   parts of the frame protrude near the two ends of the hollow of the frame from the inner side surfaces of the frame formed between the two ends of the hollow of the frame toward the hollow of the frame penetrated by the adjusting bolt and are configured to generate a pressing force against the adjusting bolt in a direction opposite to slide movement of the adjusting bolt penetrating through the hollow of the frame when the adjusting bolt penetrating through the hollow of the frame slides to one of the two ends of the hollow of the frame.

2. The adjustment bushing of claim 1, wherein, the parts of the frame protruding near the two ends of the hollow of the frame from the inner side surfaces of the frame formed between the two ends of the hollow of the frame extend perpendicularly to the slide movement of the adjusting bolt.

3. The adjustment bushing of claim 1, wherein, the parts of the frame protruding near the two ends of the hollow of the frame from the inner side surfaces of the frame formed between the two ends of the hollow of the frame extend obliquely from the inner side surfaces of the frame toward the two ends of the hollow of the frame.

4. The adjustment bushing of claim 1, wherein, the parts of the frame protruding near the two ends of the hollow of the frame from the inner side surfaces of the frame formed between the two ends of the hollow of the frame are symmetrical to each other.

5. The adjustment bushing of claim 4, wherein, one or more of the parts of the frame protruding near the two ends of the hollow of the frame from the inner side surfaces of the frame formed between the two ends of the hollow of the frame comprise one or more holes.

6. The adjustment bushing of claim 1, wherein, the frame is integrally formed with the parts of the frame protruding near the two ends of the hollow of the frame from the inner side surfaces of the frame formed between the two ends of the hollow of the frame.

7. The adjustment bushing of claim 1, wherein, the frame and the parts of the frame protruding near the two ends of the hollow of the frame from the inner side surfaces of the frame formed between the two ends of the hollow of the frame are formed by an injection molding process.

8. The adjustment bushing of claim 1, wherein, the frame and the parts of the frame protruding near the two ends of the hollow of the frame from the inner side surfaces of the frame formed between the two ends of the hollow of the frame are made of POM, PA66 or PET.

9. A steering column, comprising the adjustment bushing according to claim 1.

10. A vehicle, comprising the adjustment bushing according to claim 1.

11. The adjustment bushing of claim 2, wherein, the parts of the frame protruding near the two ends of the hollow of the frame from the inner side surfaces of the frame formed between the two ends of the hollow of the frame are symmetrical to each other.

12. The adjustment bushing of claim 3, wherein, the parts of the frame protruding near the two ends of the hollow of the frame from the inner side surfaces of the frame formed between the two ends of the hollow of the frame are symmetrical to each other.

13. The adjustment bushing of claim 1, wherein the parts of the frame protruding near the two ends of the hollow of the frame from the inner side surfaces of the frame formed between the two ends of the hollow of the frame extend in directions different from the slide movement of the adjusting bolt penetrating through the hollow of the frame.

* * * * *